LAVINIA H. FOY.

2 Sheets--Sheet 1.

Corset.

No. 6,448.

Reissued May 25, 1875.

Witnesses;
James C. Reed
John P. Comstock

Inventor;
Lavinia H. Foy

THE GRAPHIC CO. PHOTO-LITH. 39 & 41 PARK PLACE, N.Y.

2 Sheets--Sheet 2.
LAVINIA H. FOY.
Corset.
No. 6,448.
Reissued May 25, 1875.
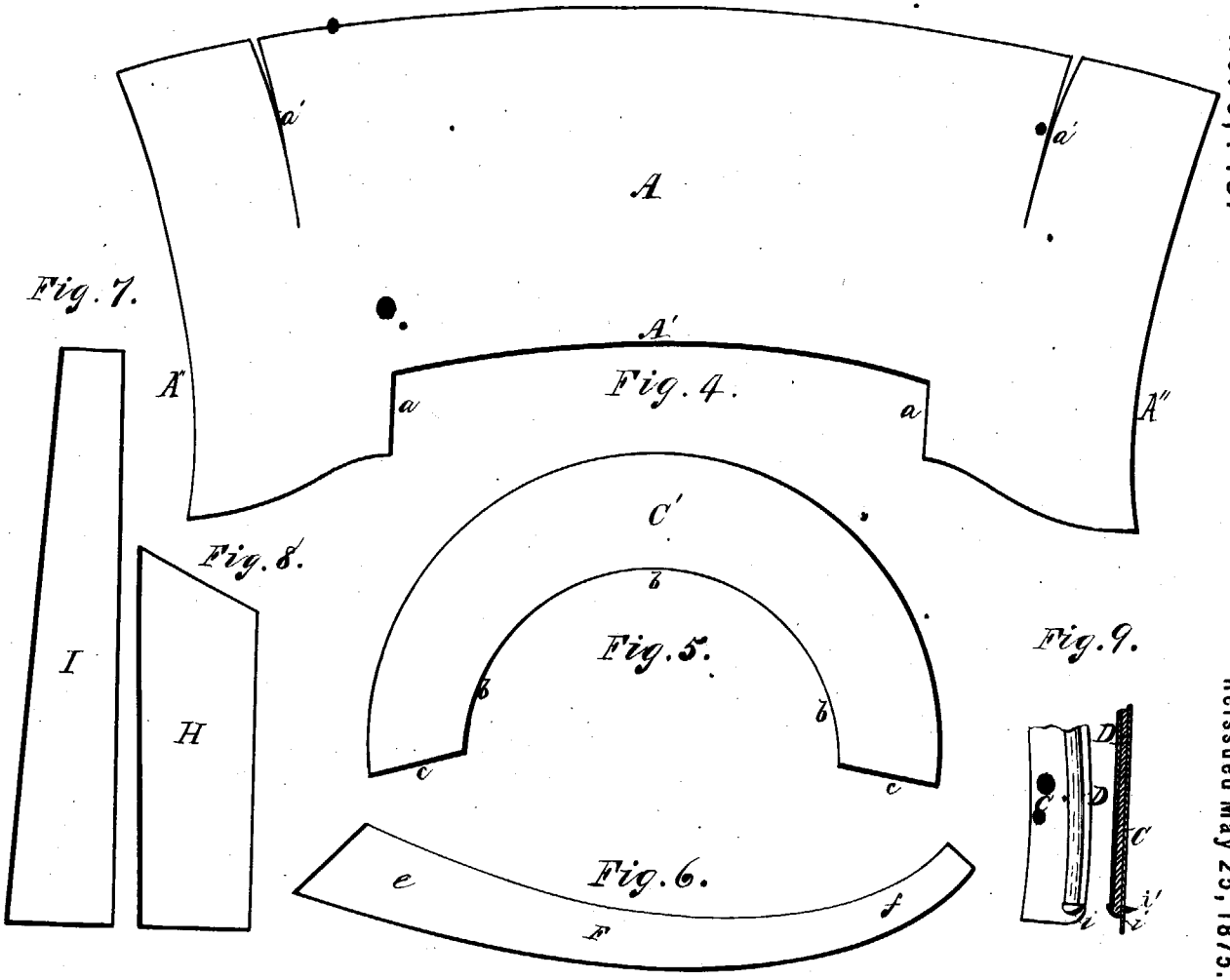
Witnesses;
Jamie C. Rich
John F. Comstock
Inventor;
Lavinia H. Foy
THE GRAPHIC CO. PHOTO-LITH. 39 & 41 PARK PLACE, N.Y.

UNITED STATES PATENT OFFICE

LAVINIA H. FOY, OF NEW HAVEN, CONNECTICUT.

IMPROVEMENT IN CORSETS.

Specification forming part of Letters Patent No. 39,908, dated September 15, 1863; reissue No. 6,448, dated May 25, 1875; application filed May 6, 1875.

*To all whom it may concern:*

Be it known that I, LAVINIA H. FOY, formerly of the city and county of Worcester and Commonwealth of Massachusetts, but now of the city and county of New Haven and State of Connecticut, have invented certain new and useful Improvements in Combined Corset, Shoulder-Brace, and Skirt-Supporter; and I do hereby declare that the following is a full, clear, and exact description of the same, reference being had to the accompanying drawings forming a part of this specification, and in which—

Figure 1:
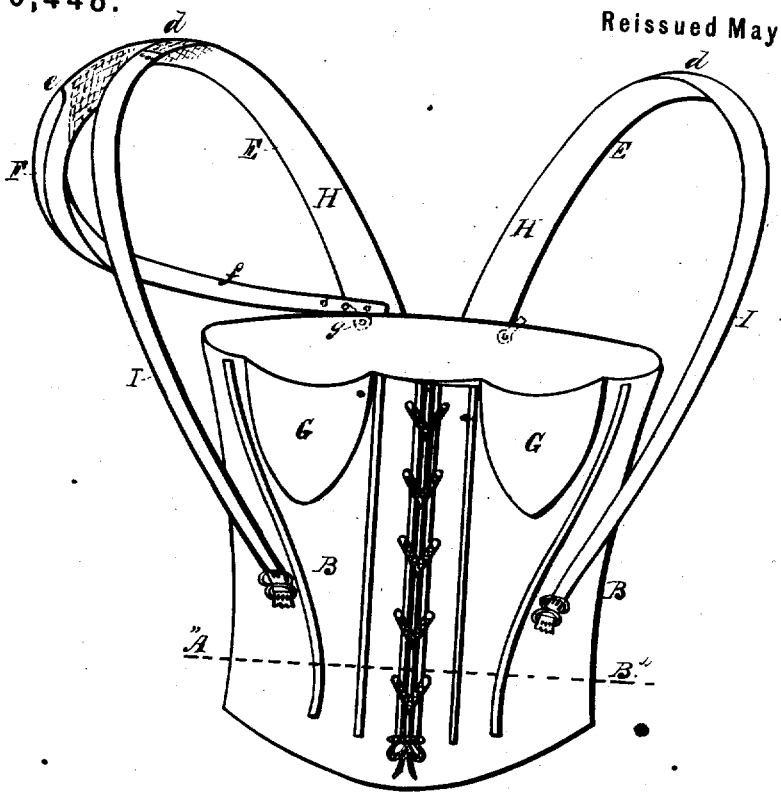
Figure 3:
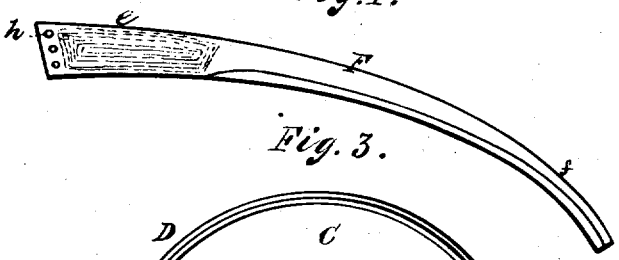
Figure 2:
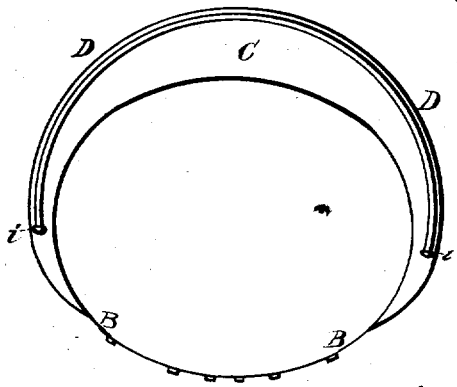

Figure 1 represents a front view of the same. Fig. 2 represents a cross-section on line A B, Fig. 1; and Figs. 3, 4, 5, 6, 7, 8, and 9 represent detached parts, as will be hereafter more fully described.

To enable those skilled in the art to which my invention belongs to make and use the same, I will proceed to describe it more in detail.

In the drawings, the part A represents the main portion which forms the body B, and in this instance a long narrow piece is cut from the lower edge A′ across the back, as seen at *a a*, Fig. 4, and this cut may extend as far toward the front edges A″ A″ as is desirable that the rim C should extend, the part or parts forming the rim C being cut separately, and of a semicircular form, as seen at C′, Fig. 5.

It will be understood that the parts from which the rim C is made must be cut of sufficient length, so that when the rim is sewed to the body part A the curved edge *b* can be sewed or stitched to the edge A′, whatever may be its length, without unduly straightening, stretching, or crimping either edge of the rim, or the parts from which it is made, which parts are to be cut, as before explained, so as to present a semicircular form when laid down flat, as indicated in Fig. 5.

In uniting the parts when cut, as shown in the drawings, the inner edge *b* and the ends *c c* of the rim C are stitched to the edges A′ and *a a* of the waist, and the hoop D inserted in the outer edge thereof, which causes the rim part C to stand out, as indicated in Fig. 2, so as to support the skirts and dress in an easy and graceful manner.

The straps E E are in two parts, the front and back parts of which are connected by elastics *d d*. The shoulder-brace F is curved and made broad to fit the arm and shoulder, as seen at *e*, and gradually tapering to the other extremity, *f*, where it is fastened by a hook, *g*. The shoulder-brace is so made that it can be readily detached from the straps E, eyelet-holes *h* being formed in each for the reception of a fastening-tape or other proper connecting device. Slits *a′ a′* are made in the front of body part A, and gores G G inserted to give the proper fullness for the bosom.

By cutting the parts which form the rim C separate from the waist or body part A the lower edge of the latter can be cut so as to fit the person quite perfectly, while the rim parts can be cut in simicircular form, so that when the rim is provided with an extender it assumes, when attached to the lower edge of the waist part A, the desired curved form to fit the person, and that, too, without any undue straining or stretching of either the lower part of the corset, or of the skirt-supporting rim.

In Fig. 1 the article is shown complete when made from pieces cut as shown in Figs. 4, 5, 6, 7, and 8.

The parts marked *i i* in the drawings represent metal caps, which may be attached so as to cover the ends of the hoop D, and they are made with two prongs or points, one of which is seen at *i′* in Fig. 9, which figure represents a top or plan view of a section of the rim C and hoop D, and also a vertical longitudinal section cut through the center of the hoop D. After the hoop D has been inserted into the rim C these metal caps may be placed over the cloth which covers the ends of the hoop, as shown in the drawings, and their prongs or points *i* forced through the cloth, one on each side of the hoop, and their projecting ends (see Fig. 9) then bent or riveted down.

Having described my improvements, what I claim as my invention, and desire to secure by Letters Patent, is—

1. The combination, with the body or waist part A, having its lower part A′ cut out, as described, and as seen in Fig. 4 at *a a*, of a semicircular piece, C′, Fig. 5, substantially as and for the purposes set forth.

2. The combination, with the lower edge of the waist or body part A, of a semicircular dress and skirt supporting rim C, the parts of which are cut separately from the body part and in semicircular form, as described, and as shown or indicated in Fig. 5, substantially as and for the purposes stated.

3. The combination, with the waist A and straps E E, of detachable shoulder-braces F.

LAVINIA H. FOY.

Witnesses:
ANNIE C. RICH,
JOHN F. COMSTOCK.